G. DECKMAN.
Churn.
No. 63,485.
Patented April 2, 1867.
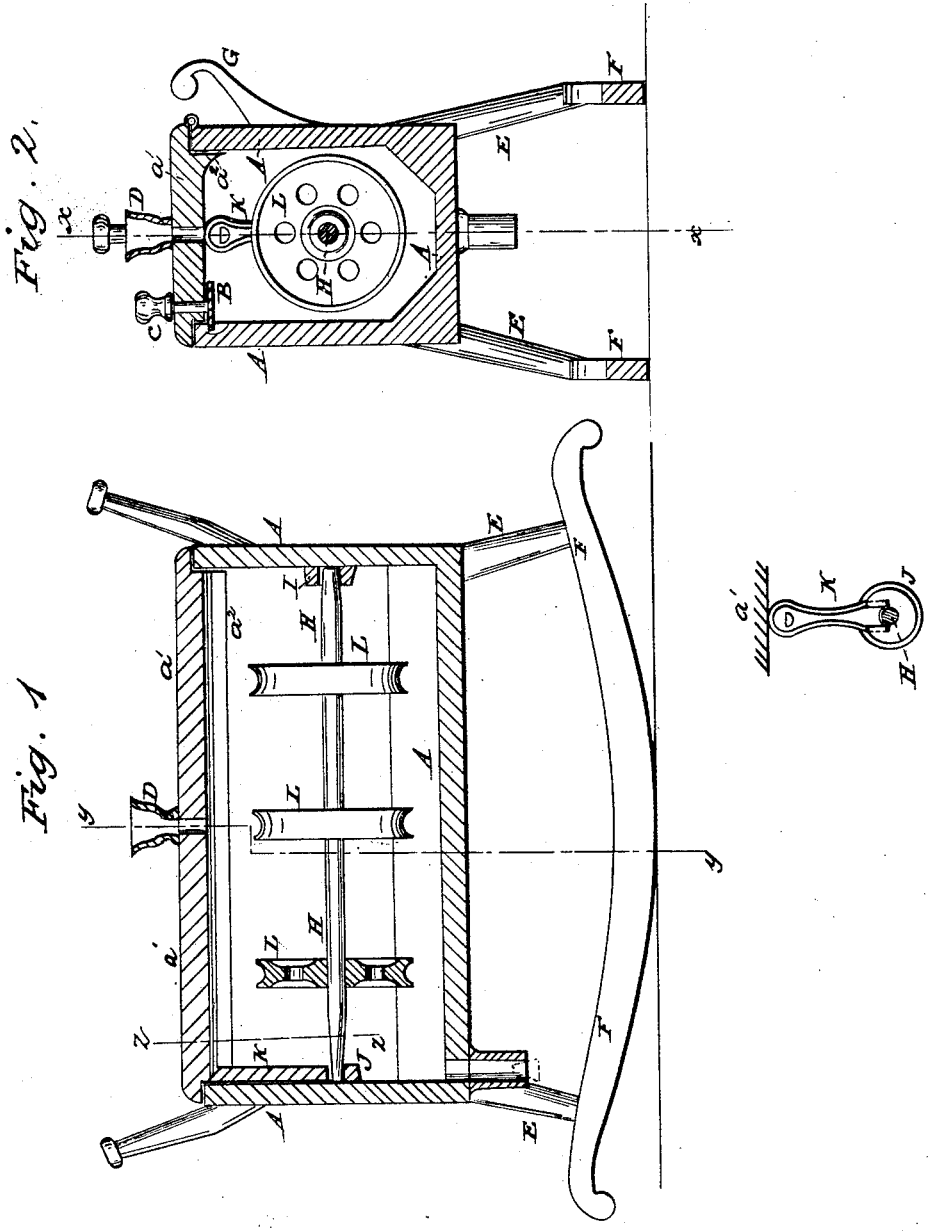

United States Patent Office.

GEORGE DECKMAN, OF MALVERN, OHIO.

Letters Patent No. 63,485, dated April 2, 1867.

IMPROVEMENT IN CHURNS.

The Schedule referred to in these Letters Patent and making part of the same.

TO ALL WHOM IT MAY CONCERN:

Be it known that I, GEORGE DECKMAN, of Malvern, in the county of Carroll, and State of Ohio, have invented a new and improved Churn; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved churn, taken through the line $x\,x$, fig. 2.

Figure 2 is a cross-section of the same, taken through the line $y\,y$, fig. 1.

Figure 3 is a detail sectional view of the same, taken through the line $z\,z$, fig. 1.

Similar letters of reference indicate like parts.

My invention has for its object to improve the construction and application of my improved churn-dasher, patented July 31, 1866, and numbered 56,728; and it consists in the combination of a series of double-concave perforated disks, attached to a horizontal shaft, with the box or body of the churn, having rockers attached to it, as hereinafter more fully described.

A is the box of the churn, which is rectangular in form, and has a hole through its bottom, through which the buttermilk or rinsing water may be drawn off. The cover $a^1$ is hinged at one edge to the upper edge of one side of the box A. The edges of the cover $a^1$ are rabbeted, as shown in the drawings, and it has at its hinged side a bevelled strip or flange, $a^2$, attached to it, to guard against the milk's spattering out. The cover $a^1$ is held closed by a button, B, attached to its under side, and operated by a knob, C, upon its upper side, as shown in fig. 2. Through the centre of the cover $a^1$ is formed a hole, to the upper orifice of which is attached a funnel-shaped cup, D, through which hot or cold water may be poured into the churn when desired. The box or body A of the churn rests upon legs E, to the lower ends of which are attached the rockers F, running longitudinally with the box A, as shown in figs. 1 and 2. G is a stop, attached to the rear side of the box A, to sustain the cover $a^1$ when open, and prevent its falling back too far. The side angles at the bottom of the box A are filled up, as shown in fig. 2, so as to make the interior of the box more nearly coincide with the shape of the dasher-disks. H is a shaft, one end of which rests in a socket, I, formed in or attached to one end of the box A, and the other end of which rests in a socket, J, attached to the other end of said box. The upper side of the block or socket J is notched or slotted, so that the shaft H may easily be put in and taken out. K is a slide, fitting into the notch in the block J, so as to hold the shaft H in place, and which may be made of such a length that the cover $a^1$, when closed, may touch its upper end, and thus hold it in its place. L are disks, any desired number of which may be placed upon the shaft H, according to the size of the box A. The sides of the disks L are made concave, as shown in the drawings, and they have each several holes formed through them, as shown. The edges or rims of the disks are grooved with a circular groove or channel, as shown in fig. 1. The effect of the peculiar shape of the disks L upon the milk, as it is thrown from end to end of the box A by the rocking motion of said box, is to form currents in various directions, which currents, encountering each other, are diverted from their courses, thus throwing the milk or cream into a violent agitation, bringing the butter in a very short time. M are the handles, by which motion is communicated to the churn, one or more of which may be attached to the ends or sides of the box A; as may be desired.

I claim as new, and desire to secure by Letters Patent—

The combination of a series of double-concave disks L, attached to a horizontal shaft H, with the box A, having rockers F attached to it, substantially as herein shown and described and for the purpose set forth.

GEORGE DECKMAN.

Witnesses:
AMOS MEIZER,
J. M. HOTCHKISS.